United States Patent
Chenevert et al.

(10) Patent No.: US 9,924,632 B2
(45) Date of Patent: Mar. 27, 2018

(54) QUICK CONNECT MOWER BLADE SYSTEM

(71) Applicant: Deere & Company, Moline, IL (US)

(72) Inventors: Jeffrey P. Chenevert, Holly Springs, NC (US); Brian K. Pearson, Burnett, WI (US)

(73) Assignee: DEERE & COMPANY, Moline, IL (US)

( * ) Notice: Subject to any disclaimer, the term of this patent is extended or adjusted under 35 U.S.C. 154(b) by 30 days.

(21) Appl. No.: 15/160,281

(22) Filed: May 20, 2016

(65) Prior Publication Data

US 2017/0332548 A1 Nov. 23, 2017

(51) Int. Cl.
*A01D 34/66* (2006.01)
*A01D 34/73* (2006.01)
*A01D 101/00* (2006.01)

(52) U.S. Cl.
CPC ........ *A01D 34/733* (2013.01); *A01D 2101/00* (2013.01)

(58) Field of Classification Search
CPC .................................................. A01D 34/733
USPC .......................................................... 56/235
See application file for complete search history.

(56) References Cited

U.S. PATENT DOCUMENTS

| 3,320,733 | A | * | 5/1967 | Kirk | A01D 34/63 |
| | | | | | 56/295 |
| 3,877,146 | A | | 4/1975 | Pittinger | |
| 4,413,468 | A | * | 11/1983 | Hockersmith | A01D 34/733 |
| | | | | | 56/295 |
| 4,586,257 | A | | 5/1986 | Rittenhouse | |
| 4,712,364 | A | | 12/1987 | Oxley | |
| 4,989,398 | A | * | 2/1991 | Kuhn | A01D 34/76 |
| | | | | | 474/199 |
| 5,117,617 | A | * | 6/1992 | Scag | A01D 34/6806 |
| | | | | | 384/128 |
| 5,163,276 | A | | 11/1992 | Mohrman | |
| 5,622,035 | A | | 4/1997 | Kondo et al. | |
| 5,782,073 | A | | 7/1998 | Sheldon | |
| 5,960,617 | A | * | 10/1999 | Sheldon | A01D 34/6806 |
| | | | | | 56/17.5 |
| 6,205,755 | B1 | | 3/2001 | Bontrager et al. | |
| 6,286,293 | B1 | * | 9/2001 | Scag | A01D 34/6806 |
| | | | | | 56/17.5 |
| 6,367,235 | B1 | | 4/2002 | Moynihan | |
| 6,681,865 | B2 | | 1/2004 | Pace | |
| 6,688,095 | B2 | * | 2/2004 | Wadzinski | A01D 34/6806 |
| | | | | | 56/17.5 |

(Continued)

FOREIGN PATENT DOCUMENTS

| WO | 2004016395 A2 | 2/2004 |
| WO | 2013049324 A1 | 4/2013 |
| WO | 2016037184 A1 | 3/2016 |

OTHER PUBLICATIONS

European Search Report issued in counterpart application No. 17170392.9 dated Oct. 10, 2017. (7 pages).

*Primary Examiner* — John Weiss

(57) ABSTRACT

A quick connect mower blade system includes a blade bolt inserted into the top end of a hollow spindle and threaded into a collet having an upright inserted into the lower end of the spindle. The collet has a head that is aligned substantially perpendicular to a hole in a blade holder if the blade bolt is tightened onto the collet to clamp a mower blade between the spindle and blade holder.

13 Claims, 3 Drawing Sheets

(56) References Cited

U.S. PATENT DOCUMENTS

| | | |
|---|---|---|
| 6,935,095 B1 | 8/2005 | Sluder |
| 7,506,494 B2 | 3/2009 | Eavenson, Sr. et al. |
| 7,703,267 B2 | 4/2010 | Tapper |
| 7,775,026 B2 | 8/2010 | Bever |
| 7,784,254 B2 | 8/2010 | Bever |
| 7,958,710 B2 | 6/2011 | Gilpatrick et al. |
| 8,869,369 B1 | 10/2014 | Roach |
| 8,935,909 B2 | 1/2015 | Eavenson, Sr. et al. |
| 8,931,248 B2 | 4/2015 | Eavenson, Sr. et al. |
| 9,010,078 B2 * | 4/2015 | MacDonald ........... A01D 43/16 30/276 |
| 9,113,595 B2 | 8/2015 | Roth et al. |
| 2007/0006562 A1 | 1/2007 | Davis et al. |
| 2011/0225832 A1 | 9/2011 | Alliss |
| 2012/0110970 A1 | 5/2012 | Blarek |
| 2013/0199148 A1 | 8/2013 | Goudeau, Jr. |
| 2014/0208710 A1 | 7/2014 | Roth et al. |
| 2014/0230397 A1 | 8/2014 | Roth et al. |
| 2015/0289447 A1 | 10/2015 | Reichen et al. |
| 2016/0014957 A1 | 1/2016 | Johansson et al. |
| 2016/0037716 A1 | 2/2016 | Johansson et al. |
| 2016/0120122 A1 * | 5/2016 | Ladd, Jr. .............. A01D 34/733 56/255 |

* cited by examiner

QUICK CONNECT MOWER BLADE SYSTEM

FIELD OF THE INVENTION

This invention relates to rotary mower blades on grass mowing machines, and specifically to a quick connect mower blade system for rotary mower blades.

BACKGROUND OF THE INVENTION

One issue that may dissatisfy users and customers of grass mowing machines is the amount of time and difficulty needed to remove and install rotary mower blades for sharpening or replacement. The blades normally are installed with a center attachment bolt and washer assembly that threads into a mower deck spindle assembly. The bolt then may be torqued to secure the blade to the spindle assembly. Depending on the size of the mower deck and the number of spindle assemblies, center attachment bolts may be difficult to reach and attach a wrench or socket to each bolt and tighten it sufficiently. A lifting device may be needed to raise the machine and provide access to the underside of the mower deck where blade fastening hardware attaches to the spindle assembly. Additionally, lifts which can adapt to a variety of grass mowing machine forms are costly and require significant shop floor space.

Some users and customers of grass mowing machines may need to change rotary mower blades frequently because of heavy usage, such as 1-2 times per week or more. For example, commercial mowers may rotate several blades on the same machine. Others may need to change rotary mower blades when the grass mowing machines are used at a distance from the blade changing tools. Additionally, users and customers may need to change rotary mower blades each time a different blade type is required. Each blade type may have a different depth, thicknesses, or edge shape to meet requirements of cut quality, lift, mulching, etc.

A quick connect mower blade system is needed that allows removal and installment of a blade without lifting the machine to provide access to blade fastening hardware under the mower deck. A quick connect mower blade system is needed that is easy to use. A quick connect mower blade system is needed that does not require application of high torque to a center attachment bolt under the mower deck, and is protected from the harsh environment under the mower deck, such as build-up of grass, dirt and debris on the attachment hardware.

SUMMARY OF THE INVENTION

A quick connect mower blade system for a mower blade positioned for rotation under a mower deck. The blade is clamped between a blade holder and a flange on the lower end of a hollow spindle. A blade bolt extending from a top end of the hollow spindle above the mower deck may be threaded to a collet extending from a bottom end of the hollow spindle, and the collet may be aligned in a locating feature in a bottom surface of the blade holder.

The quick connect mower blade system allows removal and installment of a blade without lifting the machine because the blade bolt may be accessed from the top of the mower deck. The quick connect mower blade system is easy to use, does not require high torque to a center attachment bolt under the mower deck, and is better protected from the harsh environment under the deck.

DESCRIPTION OF THE PREFERRED EMBODIMENT

Figure 1:
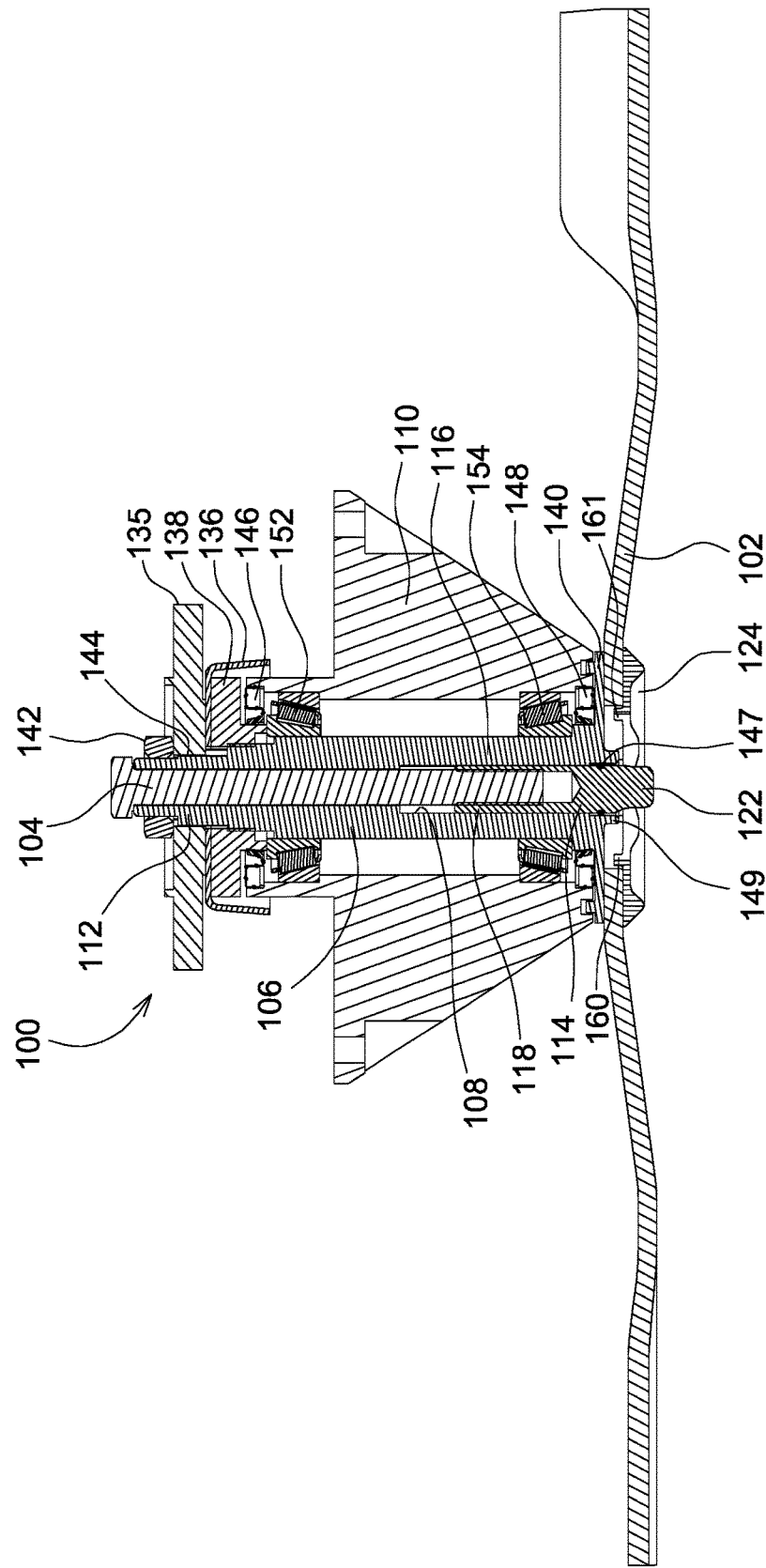
FIG. 1 is a sectional view of a quick connect mower blade system according to a first embodiment of the invention.
Figure 2:
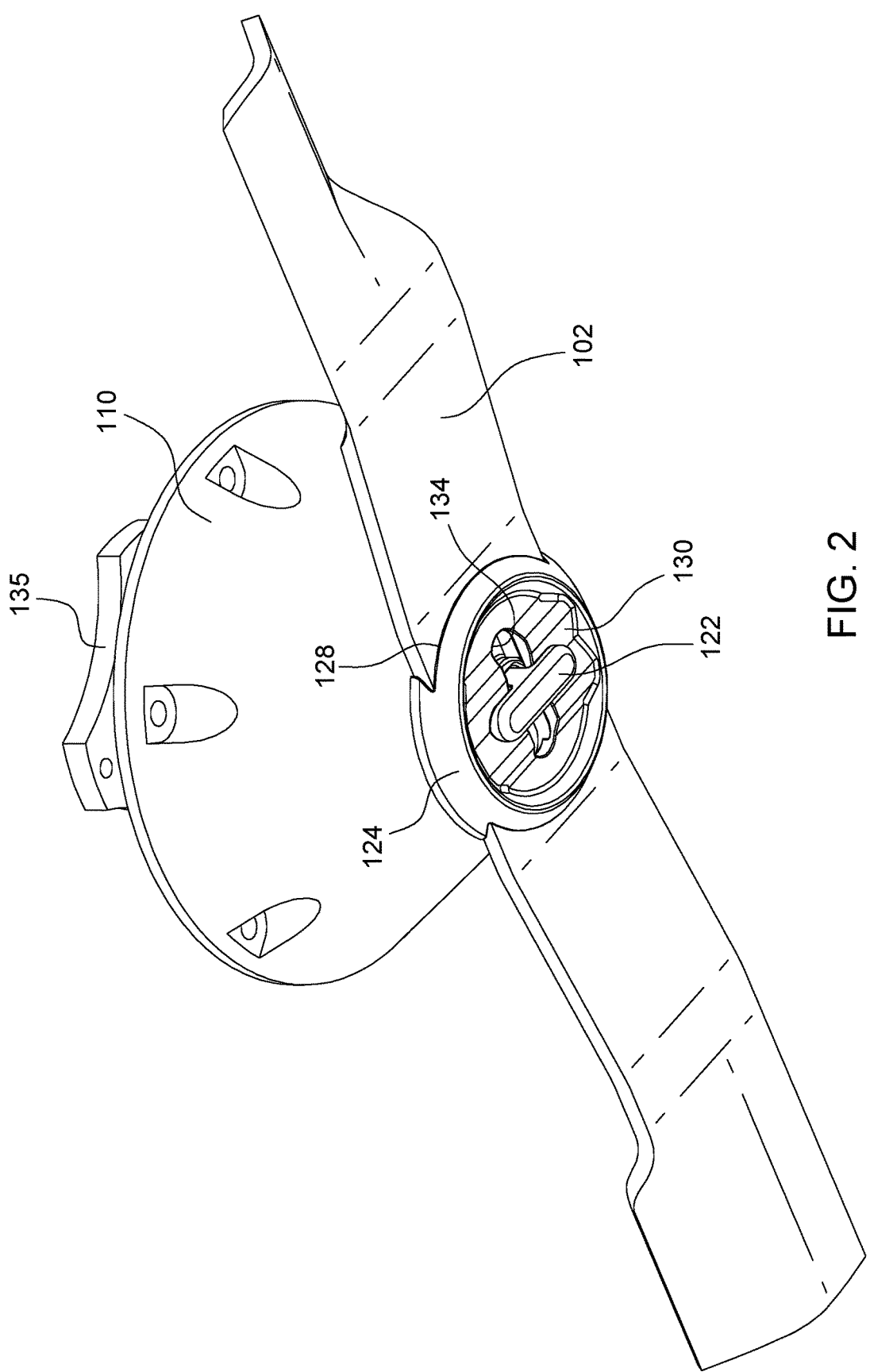
FIG. 2 is a perspective view of a quick connect mower blade system with the blade installed according to a first embodiment of the invention.
Figure 3:
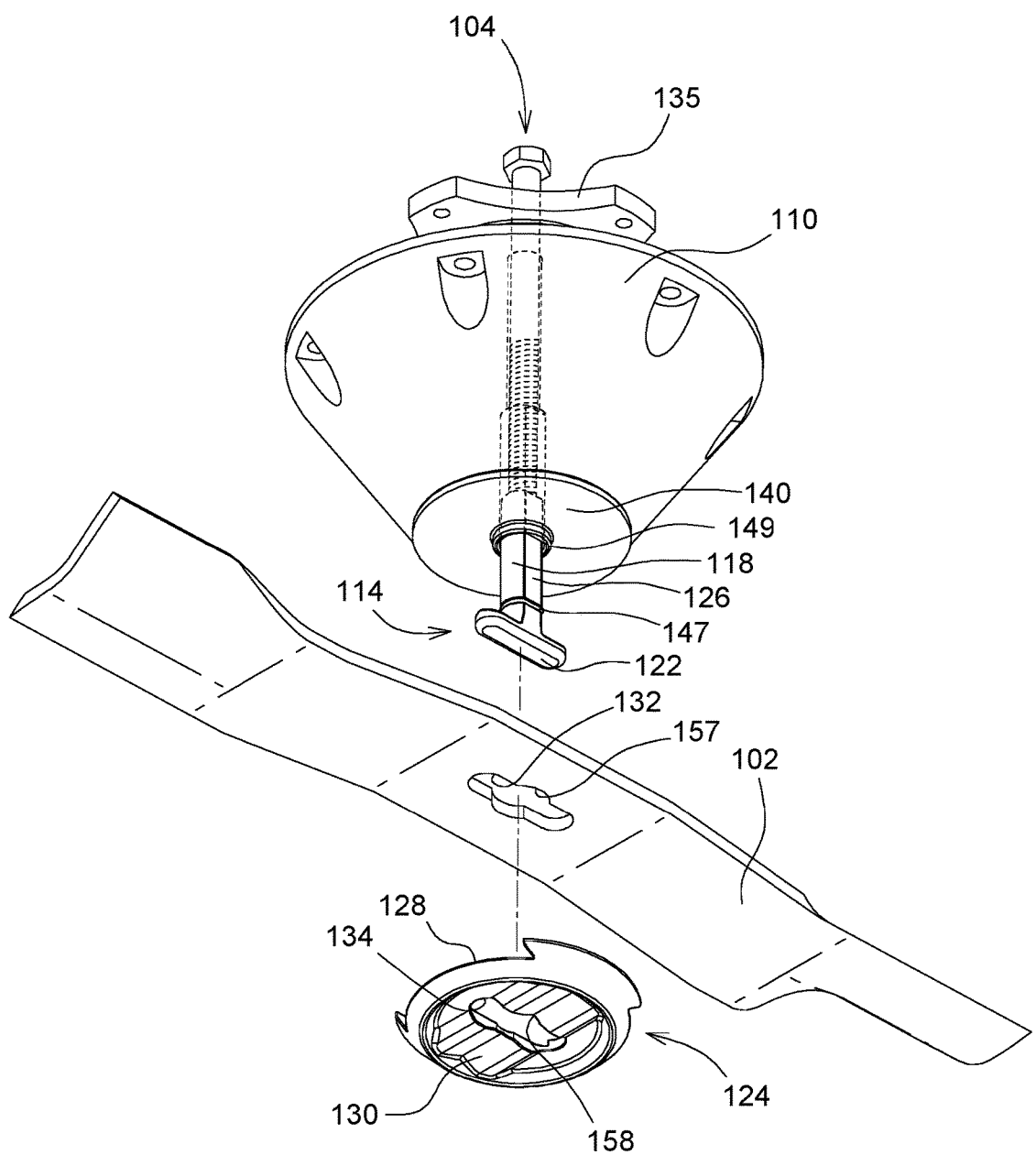
FIG. 3 is a perspective view of a quick connect mower blade system with the blade removed according to a first embodiment of the invention.

FIGS. 1-3 show one embodiment of quick connect mower blade system 100 for use with one or more rotary mower blades under a mower deck. An operator may access blade bolt 104 from the top of the mower deck to manually remove or install mower blade 102 without raising the grass mowing machine or deck. The blade bolt may be inserted into the upper end of hollow spindle shaft 106, and may engage and retract collet 114 to clamp the mower blade onto the lower end of the spindle shaft. In a preferred embodiment, blade bolt 104 may be threaded to collet 114 to provide the clamp force on the blade. Alternatively, a cam or over center device may be located on top of the spindle shaft above the mower deck, and may be used to engage and retract the collet without requiring tools.

In one embodiment, blade bolt 104 may be a standard M12 bolt having a hex head that an operator may access and tighten or loosen from the top of the mower deck. The blade bolt may be inserted into the upper end of internal bore 108 in spindle shaft 106, and the blade bolt may be threaded to collet 114. Torque may be transmitted from a power source by one or more pulleys, gear set or other means directly to spindle shaft 106, or with a hub mounted on the spindle shaft. For example, hub 135 may have a splined central opening 144 that engages the externally splined upper portion 112 of the spindle shaft, and may be secured to the spindle shaft with lock nut 142 above the mower deck surface. A pulley may be attached to hub 135 above the deck, and a belt or other driving mechanism may engage the pulley to rotate the hub and spindle shaft engaged to the hub. Shield 136 and spacer 138 also may be attached to the upper portion 112 of the spindle shaft. The spindle shaft may extend vertically through spindle housing 110 and may be supported for rotation by upper and lower bearings 152, 154 and upper and lower seals 146, 148 adjacent the bearings. Flange 140 may be provided on the lower portion of the spindle shaft and may provide a blade mounting surface. For example, the flange may have a diameter and/or width substantially the same as the mower blade width. Ring-shaped protrusion 149 may be provided on the blade mounting surface for centering corresponding ring-shaped central openings 157, 158 in mower blade 102 and blade holder 124.

In one embodiment, collet 114 may be a one-piece member having an upright 118 that is internally threaded, and a head 122. For example, the collet may have a T-shape and the collet head may be a cross member. Alternatively, the collet head may have another shape that may be retained by blade holder 124, as will be described in the following paragraph. Upright 118 may be inserted into the lower end of the hollow spindle shaft. Upright 118 may have an outer profile or cross section 126 that engages the same or similar outer profile or cross section inside the lower portion 116 of the spindle shaft bore 108. For example, upright 118 may have a D-shaped outer profile or cross section that engages the same or similar profile or cross section in the lower portion of the spindle shaft's internal bore. The upright may have a D-shape or any other outer profile or cross section such as a splined or rectangular cross section that may prevent the collet from rotating relative to the spindle shaft when the collet is positioned in the spindle shaft and the blade bolt is threaded into it. The collet, however, may rotate relative to the spindle shaft if the collet moves at least partially out of the spindle shaft when the blade bolt is substantially or completely unthreaded from the collet. O-ring 147 also may be provided in a groove in the collet adjacent the lower end of upright 118.

In one embodiment, by tightening blade bolt 104 to collet 114, mower blade 102 is clamped between flange 140 on the lower end of spindle shaft 106, and blade holder 124. Blade holder 124 may be a generally disk-shaped member having a diameter and/or width about the same or slightly greater than the width of mower blade 102. Alternatively, instead of a disk shape, the blade holder may have any other shape such as a polygon, with a top surface and a bottom surface. The top surface of the blade holder may be wide enough to receive and hold the mower blade. The top surface of the blade holder may provide surface area that directly contacts the mower blade across the mower blade's width and the same or similar length. Optionally, the top surface of the mower blade holder also may include a slot for the mower blade. Locating feature 130 may be provided in the bottom surface of the blade holder. Locating feature 130 may capture and align the head 122 of collet 114 when blade bolt 104 is tightened. For example, if the collet is T-shaped and the head is a cross member, the locating feature may be a channel or groove. Alternatively, the collet head may be any other polygonal or other shape that may be captured in a locating feature of the blade holder. When the operator substantially or completely threads blade bolt 104 into collet 114, head 122 may be pulled into and retained within locating feature 130. And, when the operator tightens the blade bolt to the collet, the head may clamp mower blade 102 between blade holder 124 and flange 140.

In one embodiment, mower blade 102 and blade holder 124 each may have central openings 157, 158 and holes 132, 134 extending outwardly from the central openings. The central openings may center the blade and blade holder on ring-shaped protrusion 149, and the holes may be dimensioned slightly larger than head 122 of collet 114. For example, the central openings may be oblong holes if the collet is T-shaped with an upright. The blade holder also may have locator tabs 160, 161 which are small projections on the edges of hole 132. The locator tabs may enter and engage hole 134 in the mower blade to orient the blade on the blade holder, and the locator tabs would shear in the event of an impact, allowing the blade to spin relative to the blade holder and spindle shaft without damage to other components. Collet head 122 may be aligned 90 degrees, or substantially perpendicular to the holes in the blade and blade bolt when the blade bolt is tightened to the collet and the blade is clamped between flange 140 and blade holder 124. The operator may release the clamp load by substantially or completely removing blade bolt 104 from the collet, and then rotating the blade and blade holder one quarter turn (90 degrees) relative to the collet head, so that both holes are aligned with the collet head, and the blade and blade holder may be removed over the collet head.

In one embodiment, the quick connect mower blade system may allow the operator to release the clamp load on mower blade 102 by accessing and unthreading blade bolt 104 from the top of the mower deck. Once the clamp load is released, the operator may remove the blade and blade holder 124 by reaching under the mower deck and twisting the blade and blade holder one quarter turn (90 degrees) and allowing the blade and blade holder to drop off the head of collet 114. The blade and blade holder are the only parts that are removed from the mower deck during blade changes, because all other components remain on spindle shaft 106 or housing 110. Installing a mower blade is the reverse of the removal process above. Locating feature 130 on blade holder 124 aligns head 122 of the collet, and keeps the blade and blade holder correctly oriented, perpendicular to the openings in the blade and blade holder, while the operator tightens blade bolt 104 to clamp the blade into position. This prevents the need to hold the blade in place while tightening the blade bolt. A collet with a T-shape is preferred, but the collet may have other geometries with a head that may be aligned with locating features in the bottom of the blade holder when the blade bolt is tightened to clamp the blade, and that fits through corresponding holes in the blade and blade bolt when the blade bolt is loosened, and the blade and blade bolt are rotated to remove the blade.

Having described the preferred embodiment, it will become apparent that various modifications can be made without departing from the scope of the invention as defined in the accompanying claims.

The invention claimed is:

1. A quick connect mower blade system, comprising:
   a blade bolt inserted into the top end of a hollow spindle and engaged to a collet having an upright inserted into the lower end of the spindle;
   the collet having a head that is aligned substantially perpendicular to a hole in a blade holder if the blade bolt is tightened onto the collet to clamp a mower blade between the spindle and blade holder.

2. The quick connect mower blade system of claim 1 wherein the collet has an outer profile that prevents rotation of the collet relative to the spindle when the upright is at least partially inserted into the lower end of the spindle.

3. The quick connect mower blade system of claim 1 further comprising a flange on the lower end of the spindle.

4. The quick connect mower blade system of claim 1 wherein the head of the collet is aligned substantially parallel to the hole in the blade holder if the blade bolt is disengaged from the collet to unclamp the mower blade, and the blade and blade holder are rotated about one quarter relative to the head.

5. The quick connect mower blade system of claim 1 wherein the blade holder includes a locating feature that captures and aligns the head of the collet when the blade bolt is tightened onto the collet.

6. A quick connect mower blade system, comprising:
   a mower blade positioned for rotation under a mower deck when the blade is clamped between a blade holder and a flange on the lower end of a hollow spindle; and
   a blade bolt extending from a top end of the hollow spindle above the mower deck and engaged to a collet extending from a bottom end of the hollow spindle, the collet aligned in a locating feature in a bottom surface of the blade holder;
   wherein the collet includes a head that is aligned perpendicular to openings in the blade and blade holder when the blade bolt is engaged to the collet.

7. A quick connect mower blade system, comprising:
   a mower blade positioned for rotation under a mower deck when the blade is clamped between a blade holder and a flange on the lower end of a hollow spindle; and a blade bolt extending from a top end of the hollow spindle above the mower deck and engaged to a collet extending from a bottom end of the hollow spindle, the collet aligned in a locating feature in a bottom surface of the blade holder;

wherein the collet includes an upright having a cross section that engages a similar cross section in the hollow spindle that prevents rotation of the collet relative to the spindle.

8. A quick connect mower blade system, comprising:

a mower blade positioned for rotation under a mower deck when the blade is clamped between a blade holder and a flange on the lower end of a hollow spindle; and a blade bolt extending from a top end of the hollow spindle above the mower deck and engaged to a collet extending from a bottom end of the hollow spindle, the collet aligned in a locating feature in a bottom surface of the blade holder;

wherein the locating feature is a channel that is 90 degrees from an oblong hole in the blade holder.

9. A quick connect mower blade system, comprising:

a blade holder having a hole, an upper surface, and a lower surface having a channel that is offset 90 degrees from the hole; and a blade bolt extending above a mower deck and engaged to a collet having a head positioned in the channel to clamp a mower blade against the upper surface of the blade holder; and disengaged from the collet and the blade holder rotated 90 degrees to align the hole with the head to release the mower blade from the upper surface of the blade holder.

10. The quick connect mower blade system of claim 9 further comprising a hollow spindle into which the blade bolt and collet are inserted.

11. The quick connect mower blade system of claim 10 wherein the hollow spindle includes a flange, the collet clamping the mower blade between the flange and the upper surface of the blade holder.

12. The quick connect mower blade system of claim 9 further comprising a hole in the mower blade corresponding to the hole in the blade holder.

13. The quick connect mower blade system of claim 12 further including locator tabs on the edges of the hole of the blade holder that engage the hole in the mower blade.

* * * * *